Aug. 20, 1940. K. M. SIMPSON 2,212,459
RECOVERY OF NICKEL FROM NICKEL CONTAINING IRON ORES
Filed Feb. 7, 1939
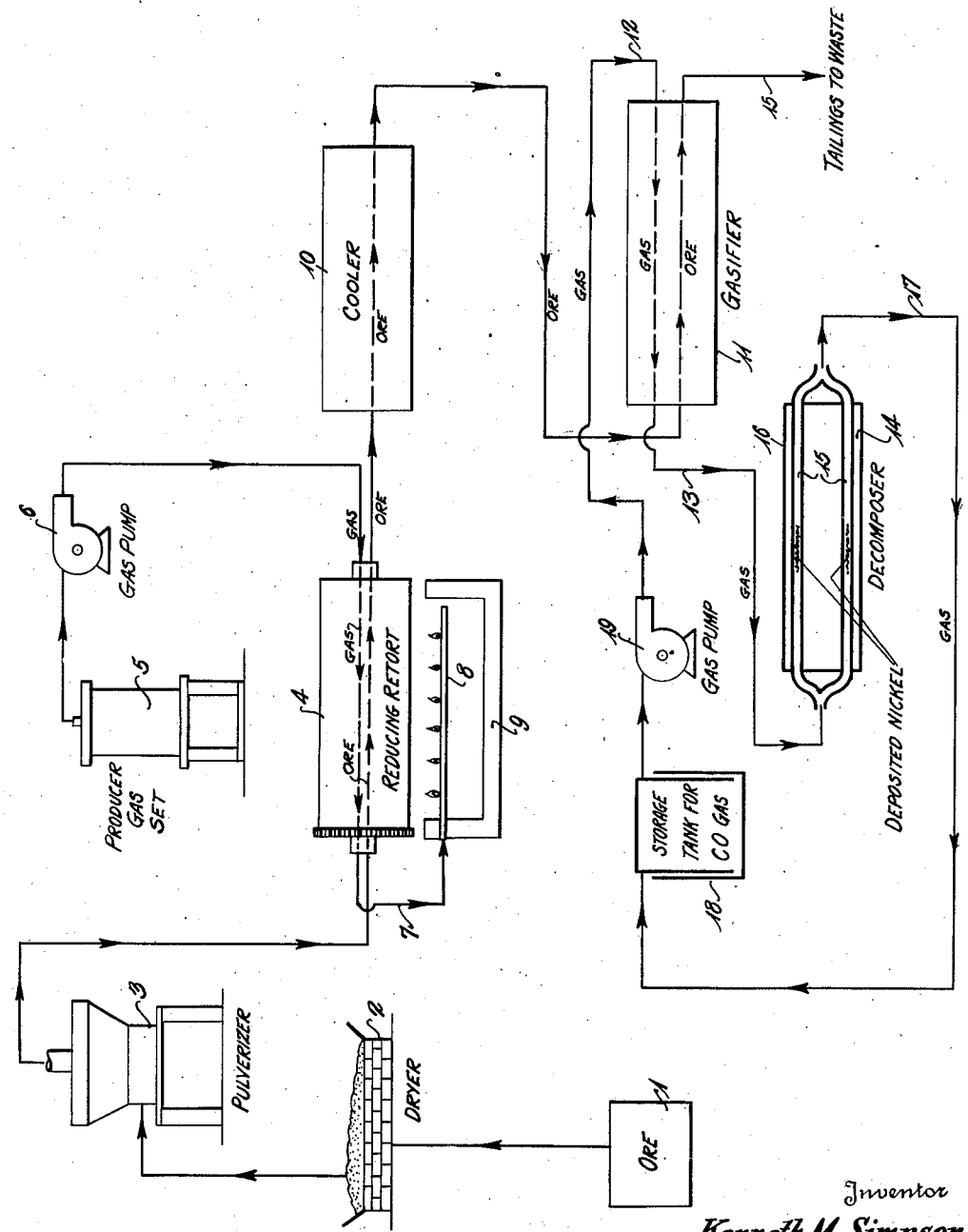
Inventor
Kenneth M. Simpson
By Bacon & Thomas,
Attorneys

UNITED STATES PATENT OFFICE 2,212,459

RECOVERY OF NICKEL FROM NICKEL CONTAINING IRON ORES

Kenneth M. Simpson, New York, N. Y.

Application February 7, 1939, Serial No. 255,146

7 Claims. (Cl. 75—82)

This invention relates to the recovery of nickel from nickel containing iron ores, and more particularly to a process in which nickel carbonyl is formed, separated from the ore and decomposed to produce substantially pure nickel.

In accordance with the present invention, I have found that many iron ores containing small amounts of nickel can be treated by a carbonyl process to recover substantially pure nickel from the iron ore without preliminary treating of the ore to remove the iron. That is to say, the extremely expensive and time consuming steps of first forming a matte substantially free from iron are eliminated as the nickel is removed from the ore as nickel carbonyl in the presence of iron. Many iron ores occur in the oxide form substantially free of sulfur but contain appreciable quantities of nickel for which no practical process has heretofore been known for removing the nickel. In accordance with the present invention, most of the nickel can be removed from the iron ore as the primary product of the process and the iron ore itself is improved so that it can be directly smelted into iron usable for many purposes.

In the preferred process, an ore containing iron and nickel, in which the metals, or at least the nickel, occur as oxides or have been converted to oxides, is ground, if necessary, in a ball mill or other apparatus. The ore is selectively reduced so as to reduce nickel oxides without reducing substantial quantities of iron oxides, and then treated with carbon monoxide to form nickel carbonyl, which is then decomposed to produce substantially pure nickel. In a modification of the process, a substantial amount of the iron may also be reduced and substantial amounts of iron carbonyls also formed by suitable treating temperatures. The present invention also contemplates steps for separating the iron carbonyl from the nickel carbonyl so that substantially pure nickel carbonyl can be decomposed into substantially pure nickel. The separated iron carbonyl can also be decomposed to recover substantially pure iron.

It is, therefore, an object of the present invention to provide a process of recovering nickel from iron ores containing the same, without necessitating the removal of the iron prior to treatment of the ore for the recovery of nickel.

Another object of the invention is to provide a process of selectively reducing nickel oxide from an iron oxide ore containing nickel oxide and separating the reduced nickel from the ore in the form of a carbonyl.

A further object of the invention is to provide a process of recovering nickel from a reduced ore containing iron in which iron and nickel carbonyls are formed, the iron carbonyl separated from nickel carbonyl and the nickel carbonyl thereafter decomposed to produce substantially pure nickel.

A still further object of the invention is to provide a process of separately recovering nickel and iron from ores containing the same by converting nickel and iron in the ore to carbonyls, separating the nickel and iron carbonyls and separately decomposing the same.

Other objects and advantages of the invention will appear in the following description of preferred embodiments of the invention made in accordance with the attached drawing, which shows a flow sheet of a preferred process.

As shown in the drawing, the iron oxide ore containing nickel oxide is withdrawn from a source 1 and, if necessary, dried in a dryer 2 and converted to finely divided form in a pulverizer 3. The ore is then introduced into a reducing retort 4 in which, in the preferred operation, the nickel oxide is reduced to metallic nickel without reducing substantial quantities of iron oxide to metallic iron. I have found that this may be accomplished by maintaining a temperature in the reducer of between approximately 350° and 500° C. and preferably about 350° C. The reducing gas ordinarily used is either water gas or producer gas, preferably producer gas obtained from a producer 5 and delivered to the reducing retort 4 by a gas pump 6. Since the reducing gas is ordinarily produced at a relatively high temperature, I preferably employ the heat thereof in maintaining the reducing retort 4 at the desired temperature. All or a portion of the spent reducing gas may be withdrawn from the reducing retort 4 through a conduit 7 and delivered to a burner 8 positioned in a housing 9 below the reducing retort. A cylindrical retort rotated about a horizontal axis is preferred, but any suitable apparatus capable of repeatedly bringing the ore particles into contact with the reducing gas may be employed. It will be understood that the reducing retort is closed against the escape of gas and that suitable mechanism may be employed for introducing and withdrawing ore. The reducing retort is preferably maintained under a low superatmospheric pressure, for example, 2 pounds per square inch. At the temperatures mentioned, substantially all of the nickel oxide can be reduced without reducing substantial quantities of iron oxides, particularly if the ore is withdrawn from the reducer as soon as nickel oxide reduction has progressed to the desired extent.

The ore withdrawn from the reducer is delivered to an ore cooler 10 in which the temperature of the ore is lowered to between 40 and 80° C., and preferably to a temperature in the lower portion of this range. The cooled ore is then delivered to a gasifier 11 into which a gas rich in carbon monoxide is introduced through a conduit 12. The gasifier is also closed against the escape of the gas and is preferably operated under a low superatmospheric pressure, for example, 2 pounds per square inch. Suitable closed conveying means (not shown) are employed to transfer the ore from the reducing retort 4 to the ore cooler 10 and from the ore cooler 10 to the gasifier 14 in order to prevent contact between the ore and the external atmosphere. A temperature of between 40 and 80° C. is maintained in the gasifier. The carbon monoxide combines with the nickel at these temperatures to produce nickel carbonyl and a gas rich in nickel carbonyl is withdrawn from the vaporizer through a conduit 13 and delivered to a decomposer 14. The iron ore from which nickel has been separated is discharged from the process as indicated at 15. It will be understood that the process may be operated to reduce only a portion of the nickel in the reducing retort 4, in which case a portion of the ore removed from the gasifier 11 may be recycled through the reducing retort 4 or through another reducing retort and then back to the gasifier 11. Alternatively, the ore discharged from the gasifier 11 may be subjected to further reducing and gasifying steps in other reducing retorts and gasifiers in order to remove additional nickel therefrom. In any case, the gas rich in nickel carbonyl is delivered to a decomposer 14.

In the decomposer 14 the gas rich in nickel carbonyl is heated to a decomposing temperature, for example a temperature above 200° C. The nickel carbonyl decomposes to liberate metallic nickel, which is deposited in the decomposer, and carbon monoxide. The nickel may be deposited as solid masses in a great variety of shapes, such as cylinders or long tubes. Preferably the decomposer comprises a series of tubes 15 which may be positioned in a heating chamber 16 through which any desired heating medium such as products of combustion may be circulated. The carbon monoxide rich gas formed in the decomposer is withdrawn through a conduit and delivered to a gas storage tank 18 from which it is recirculated by a pump 19 through the gasifier 11 to form additional nickel carbonyl which is decomposed in the decomposer 14 to again liberate carbon monoxide rich gas.

In some cases it is desirable to cause a substantial amount of iron oxide to be reduced in the reducing retort 4 with consequent production of iron carbonyl in the gasifier 11. The higher temperatures within the range given for reduction, coupled with increased time of reduction treatment, are effective to reduce greater amounts of iron. The iron carbonyl may also be decomposed in the decomposer 14. The iron carbonyl may, however, be separated from the nickel carbonyl before the latter is delivered to the decomposer. This may be accomplished in several ways in accordance with the present invention. Both iron carbonyl and nickel carbonyl are soluble in such solvents as benzene or alcohol. As the nickel carbonyl and iron carbonyl have considerably different boiling points, the boiling point of nickel carbonyl being about 43° C. and the boiling point of iron pentacarbonyl being about 103° C., the nickel and iron carbonyls may be dissolved in such a solvent and then selectively volatilized from the solvent, for example, in a still and fractionating column. Furthermore, both the nickel and iron carbonyls can be reduced to liquid form by cooling the same below their boiling points. Since iron carbonyl has considerably higher boiling point than the nickel carbonyl, it can be selectively condensed from the mixture of gases. On the other hand, both the iron and nickel carbonyl can be cooled to liquid form and the nickel carbonyl separated from the iron carbonyl by fractional distillation. In any event, the nickel carbonyl can be freed of iron carbonyl to any desired extent by employing one or more of the steps above discussed, such that substantially pure nickel is produced when the nickel carbonyl is decomposed. The iron carbonyl separated from the nickel carbonyl is also preferably decomposed in a decomposer (not shown) so that the iron is recovered and the carbon monoxide resulting from the decomposition made available for use in the gasifier.

The process above described is particularly applicable to certain ores found in large quantities in Cuba, although it is applicable to other similar ores. The Cuban ores referred to occur in the eastern portion of that island. These deposits are of great extent and large tonnages of iron ore exist carrying from .05 to 1.75% nickel and from .05 to .2% cobalt. The nickel in these ores occurs as an oxide or a hydroxide, the term "oxide" being employed elsewhere in the specification and in the claims as being inclusive of both forms. The nickel is in a microscopic state of division such that very little grinding of the ore is required before removing the nickel.

While I have described the preferred embodiments of my invention, it is understood that the details may be varied within the scope of the following claims.

What I claim is:

1. The process of recovering substantially pure nickel from iron oxide ores containing relatively small amounts of nickel oxide, which comprises, selectively reducing said ore to reduce the major portion of said nickel oxide while retarding the reduction of iron oxide, treating the reduced ore with carbon monoxide at a temperature between 40 and 80° C. to form gaseous nickel carbonyl containing a relatively small amount of gaseous iron carbonyl, separating the iron carbonyl from the nickel carbonyl and decomposing said nickel carbonyl to produce substantially pure nickel.

2. The process of recovering nickel from iron ores containing relatively small amounts of nickel oxide, which comprises, reducing said ores to convert nickel to metallic form while retarding the conversion of iron to metallic form, treating the reduced ore with carbon monoxide to form nickel carbonyl vapor admixed with a relatively small amount of iron carbonyl vapor, separating the iron carbonyl vapor from said nickel carbonyl vapor and decomposing the nickel carbonyl to deposit metallic nickel.

3. The process of recovering nickel from iron ores containing relatively small amounts of nickel oxide, which comprises, reducing said ores to convert nickel to metallic form while retarding the conversion of said iron to metallic form, treating the reduced ore with carbon monoxide to form nickel carbonyl vapor admixed with a small amount of iron carbonyl vapor, separating the nickel carbonyl from the iron carbonyl by utilizing the difference in the boiling points of the nickel carbonyl and iron carbonyl and heating nickel carbonyl vapor to decompose the same and deposit metallic nickel.

4. The process of recovering substantially pure nickel from iron oxide ores containing relatively small amounts of nickel oxide, which comprises, selectively reducing said ore without a prior smelting step to reduce nickel nickel oxide while retarding the reduction of iron oxide, treating the reduced ore with carbon monoxide at a temperature between 40 and 80° C. to form gaseous nickel carbonyl containing a relatively small amount of gaseous iron carbonyl, separating the iron carbonyl from the nickel carbonyl and decomposing said nickel carbonyl to produce substantially pure nickel.

5. The process of recovering nickel from iron ores containing relatively small amounts of nickel oxide, which comprises, reducing said ores to convert nickel to metallic form while retarding the conversion of iron to metallic form, treating the reduced ore with carbon monoxide to form nickel carbonyl vapor admixed with a relatively small amount of iron carbonyl vapor, separating the nickel carbonyl vapor from the iron carbonyl vapor by dissolving said carbonyls in a solvent therefor, fractionally distilling the nickel carbonyl from the resulting solution and decomposing the same to deposit metallic nickel.

6. The process of recovering nickel from iron ores containing relatively small amounts of nickel oxide, which comprises, reducing said ores to convert nickel to metallic form while retarding the conversion of iron to metallic form, treating the reduced ore with carbon monoxide to form nickel carbonyl vapor admixed with a relatively small amount of iron carbonyl vapor, separating the nickel carbonyl vapor from the iron carbonyl vapor by fractionally condensing said vapors, and decomposing the nickel carbonyl to deposit metallic nickel.

7. The process of recovering nickel from iron ores containing relatively small amounts of nickel oxide, which comprises, reducing said ores to convert nickel to metallic form while retarding the conversion of iron to metallic form, separating the nickel carbonyl vapor from the iron carbonyl vapor by condensing said vapors, fractionally distilling nickel carbonyl from said iron carbonyl, and decomposing the nickel carbonyl to deposit metallic nickel.

KENNETH M. SIMPSON.